(12) United States Patent
Price et al.

(10) Patent No.: US 6,986,154 B1
(45) Date of Patent: Jan. 10, 2006

(54) SYSTEM AND METHOD FOR SELECTING CONTENT TO BE PRESENTED TO A USER

(75) Inventors: William P. Price, Fountain Valley, CA (US); Timothy J. Elliott, Fountain Valley, CA (US); R. Gregory Kalsow, Lake Forest, CA (US)

(73) Assignee: Keen Personal Media, Inc., Lake Forest, CA (US)

( * ) Notice: Subject to any disclaimer, the term of this patent is extended or adjusted under 35 U.S.C. 154(b) by 955 days.

(21) Appl. No.: 09/773,940

(22) Filed: Jan. 31, 2001

(51) Int. Cl.
*G06F 3/00* (2006.01)

(52) U.S. Cl. ............................ 725/46; 725/32; 725/34; 725/35

(58) Field of Classification Search ................... 725/34, 725/36, 46, 121, 122, 35, 131, 132
See application file for complete search history.

(56) References Cited

U.S. PATENT DOCUMENTS

| | | | |
|---|---|---|---|
| 5,696,965 | A | 12/1997 | Dedrick |
| 5,758,257 | A * | 5/1998 | Herz et al. ................... 725/116 |
| 6,161,142 | A | 12/2000 | Wolfe et al. |
| 6,177,931 | B1 | 1/2001 | Alexander et al. |
| 6,298,482 | B1 * | 10/2001 | Seidman et al. ............ 725/101 |

OTHER PUBLICATIONS

PCT International Search Report dated Jul. 16, 2002; PCT/US02/02988.

* cited by examiner

*Primary Examiner*—Ngoc Vu
(74) *Attorney, Agent, or Firm*—Knobbe, Martens, Olson & Bear

(57) ABSTRACT

A system for receiving and presenting content at a user location includes a profiling agent that creates a user profile based upon a plurality of inputs by a user. The user profile represents preference characteristics of the user. A storage device is coupled to the profiling agent and stores the user profile. A receiver is configured to receive a set of parameters defined for at least one content. The set of parameters originates from a source of contents. A processing module is coupled to the receiver and the storage device and correlates the user profile with the set of parameters to determine whether parameters in the set of parameters match preference characteristics in the user profile. The processing module further generates a match signal when a sufficient number of the parameters match preference characteristics in the user profile. A transmitter is coupled to the processing module and sends the match signal to the source of contents which stores the content defined by the set of parameters for sending to the user location upon receipt of the match signal.

33 Claims, 4 Drawing Sheets

SYSTEM AND METHOD FOR SELECTING CONTENT TO BE PRESENTED TO A USER

BACKGROUND OF THE INVENTION

1. Field of the Invention

The invention relates to a system and a method for transmitting data. More particularly, the invention relates to a system and a method for presenting content to a user.

2. Description of the Related Art

An example of a system that transmits data and presents content to a user is a conventional system for displaying video data or video content. The conventional system includes a monitor or a television (TV) set connected to a set top box. The set top box is connected through a coaxial cable to a cable TV network or a satellite dish for "satellite TV." The TV set and the set top box are located, for example, in a user's home and receive a multitude of TV channels from a broadcast head end, wherein each TV channel has a multitude of programs during a typical day. The broadcast head end may further transmit an electronic program guide. In order to select and watch a certain program, the user controls, for example, the set top box to tune to a desired channel. The TV set receives a video signal from the set top box and displays the program of the desired channel.

A user may expand the system by connecting a video recorder to the TV set and the set top box to personalize television viewing by recording a program and watching it when it is convenient for the user. Further, the user may subscribe to and receive premium content such as subscription channels, pay-per-view services or video-on-demand services in order to watch a movie on a certain day and at a time of day for which the user has to pay a per-movie fee. The user may further personalize television viewing by subscribing to services such as ReplayTV (offered by Replay Network) and TiVo (offered by Philips). For instance, the video recorder may be a digital video recorder that includes a hard disk drive with a storage capacity of between 10 GB and 30 GB for recording of up to 30 hours of television programming.

Furthermore, the conventional system may enable the user to subscribe to and receive premium content such as subscription channels, pay-per-view services or video-on-demand services in order to watch a movie on a certain day and at a time of day for which the user has to pay a per-movie fee. Providers of these services, of course, want to attract as many users as possible so that the providers also advertise for their services and specific contents such as movies. For example, video clips or trailers for movies are broadcast on the subscription channels and the pay-per-view channels, or are added as commercials to the other broadcast channels.

As is conventional television, personalized television is therefore also closely associated with advertising display content (e.g., pay-per-view movies) and commercials for products or services. Advertisers try to place their commercials so that a well-defined target group, which is likely to watch certain types of programs, may see the commercials. The movie trailers or the commercials, however, may be "buried" by the multitude of available broadcast channels. In order to better define the target group, the advertisers would like to have as much information as possible about the viewing habits of individual users or a group of users. However, the advertisers' interest conflicts with the users' privacy interest.

SUMMARY OF THE INVENTION

An object of the invention is, therefore, to provide a method and system for presenting content (e.g., video, audio, text, images) to a user so that it is more likely that the user is interested in the content and in fact uses the content, for example, views video content or images, reads texts content or listens to audio content. In addition, an object of the invention is to present the content to the user so that the user's privacy interest is respected.

An aspect of the present invention may be regarded as method of presenting content to a user. The method includes creating a user profile based upon a plurality of inputs by a user and maintaining the user profile at a user location. The user profile represents preference characteristics of the user. The method receives at the user location a set of parameters defined for at least one content. The set of parameters originates from a source of contents. The method correlates the user profile at the user location with the set of parameters to determine whether parameters in the set of parameters match preference characteristics in the user profile. The method reports a match from the user location to the source of contents when a sufficient number of the parameters match preference characteristics in the user profile.

The present invention may further be regarded as a method of selecting content for presentation to a user. The method creates a user profile based upon a plurality of inputs by a user and maintains the user profile at a user location. The user profile represents preference characteristics of the user. The method receives at the user location a set of parameters defined for at least one content, wherein the set of parameters originate from a source of contents. The method correlates the user profile at the user location with the set of parameters to determine whether parameters in the set of parameters match preference characteristics in the user profile. The method generates a match signal when a sufficient number of the parameters match preference characteristics in the user profile. The method sends the match signal from the user location to the source of contents.

The present invention may be regarded as system for receiving and presenting content at a user location. A profiling agent creates a user profile based upon a plurality of inputs by a user. The user profile represents preference characteristics of the user. A storage device is coupled to the profiling agent and stores the user profile. A receiver is configured to receive a set of parameters defined for at least one content. The set of parameters originates from a source of contents. A processing module is coupled to the receiver and the storage device and correlates the user profile with the set of parameters to determine whether parameters in the set of parameters match preference characteristics in the user profile. The processing module further generates a match signal when a sufficient number of the parameters match preference characteristics in the user profile. A transmitter is coupled to the processing module and sends the match signal to the source of contents, which stores the content defined by the set of parameters.

BRIEF DESCRIPTION OF THE DRAWINGS

These and other aspects, advantages, and novel features of the invention will become apparent upon reading the following detailed description and upon reference to the accompanying drawings. In the drawings, same elements have the same reference numerals.

DETAILED DESCRIPTION OF THE PREFERRED EMBODIMENT

Figure 1:
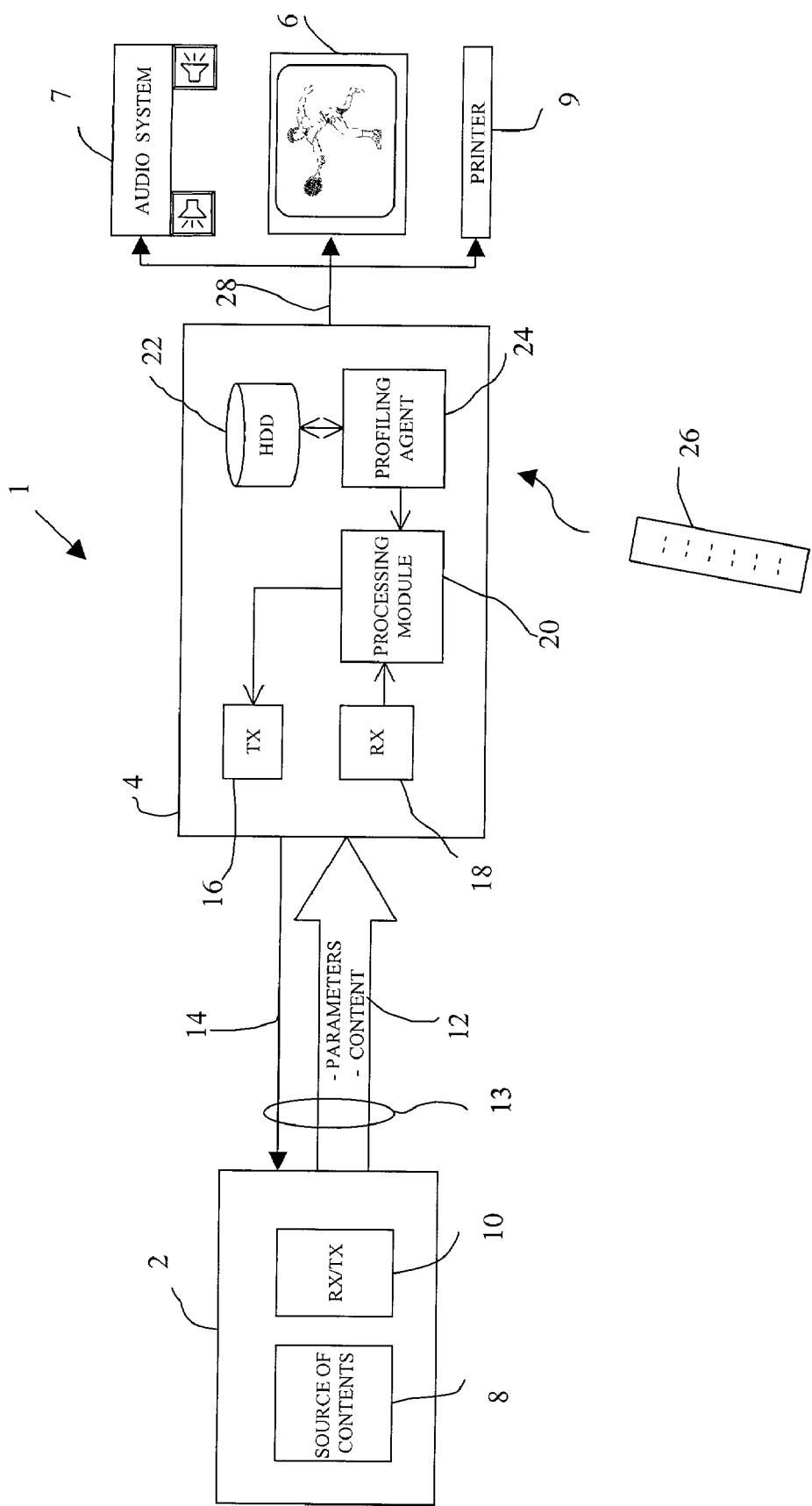
FIG. 1 shows a system for transmitting and receiving a stream of data in accordance with an embodiment of the present invention that includes a broadcast head end coupled to a receive apparatus, wherein the broadcast head end includes a source for contents that provides the contents and related parameters, and wherein the receive apparatus correlates received parameters with a user profile to determine whether the parameters match preference characteristics in the user profile and reports a match to the source of contents when a sufficient number of parameters match the preference characteristics.

FIG. 1 shows an embodiment of a system 1 for transmitting and receiving content (e.g., video, audio, images, text) in accordance with an embodiment of the present invention, which is configured to operate in accordance with the method of the present invention. The system 1 includes a broadcast head end 2, hereinafter "head end 2," and a receive apparatus 4 coupled to the head end 2 via a network 13 and to a display 6, to an audio system 7, and to a printer via a connection 28. The head end 2 may be under control of a multiple service operator and includes a source 8 of contents and a transceiver 10 (RX/TX) to send contents and related parameters to the receive apparatus 4. The receive apparatus 4 includes a receiver 18 (RX), a transmitter 16 (TX), a processing module 20, a profiling agent 24 and a storage device 22 (HDD). In one embodiment, the receive apparatus 4 may be implemented within a set top box (STB), a digital (personal) video recorder (DVR) or a combination of a set top box and a digital video recorder controllable with a remote control 26. Further structural details of the system 1 are described following a functional description of the system 1 set forth hereinafter.

Figure 2:
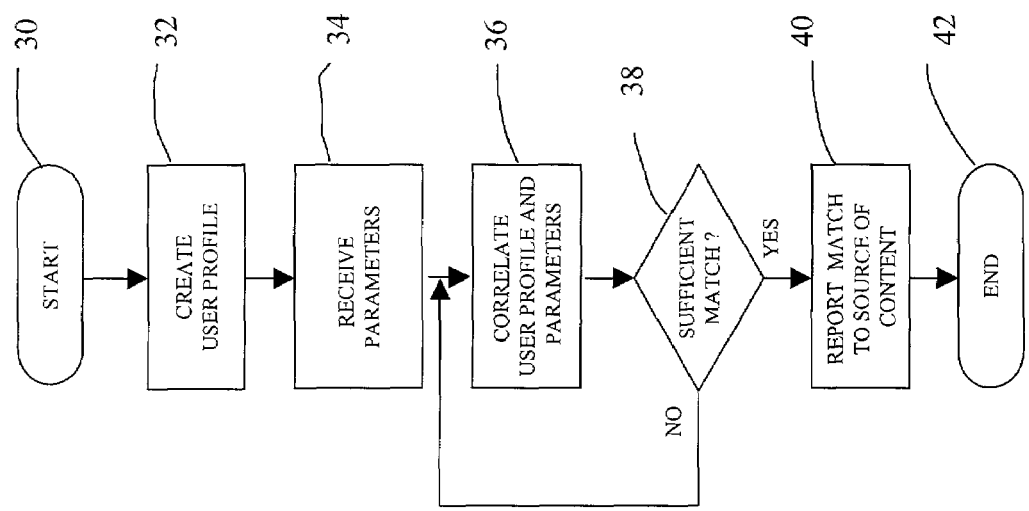
FIG. 2 is a flowchart of a procedure illustrating the method in accordance with an embodiment of the present invention that creates a user profile representing preference characteristics of the user, that receives a set of parameters, that correlates the user profile with the set of parameters and that reports a match to a source of content when a sufficient number of the parameters match the preference characteristics.

FIG. 2 is a flowchart of a procedure illustrating the method in accordance with the present invention that presents content to a user. The procedure presents the content to the user so that it is more likely that the user is interested in the content and will use the content (for example, view video content or images, read text content, listen to audio content or perform other activities with respect to content). Advantageously, the procedure also provides that the user's privacy interest is respected.

In a step 30, the procedure initializes the system 1. The initialization procedure includes, among others, determining the number of video programs that are scheduled or requested and obtaining from the source 8 for content a set of parameters for each video program. The set of parameters includes parameters that define a group of "target" users for which the content is likely to be of interest. The parameters may define that the content may be interesting for a user that likes to watch a particular genre and that prefers to watch TV at a certain day and time. For example, a "target" user may be a user that likes action movies on a Saturday evening.

In a step 32, the procedure creates a user profile based upon a plurality of inputs by a user. The user profile represents preference characteristics of the user. The user profile is maintained at a user location, for example, in the user's home on the storage device 22 of the receive apparatus 4. In one embodiment, the procedure keeps track of the user's preferences by recording the channels the user selected, at what days and times. The receive apparatus 4 may then cross-reference this information with an electronic program guide to determine the kind of content the user prefers at these times.

In a step 34, the procedure receives at the user location a set of parameters defined for a content. The set of parameters originates from the source 8 of contents of the head end 2 and defines a group of "target" users for the content.

In a step 36, the procedure correlates the user profile with the set of parameters to determine whether parameters in the set of parameters match preference characteristics in the user profile. For example, the procedure determines a match when a genre parameter "Action" matches a genre preference characteristic "Action."

In a step 38, the procedure determines if a sufficient number of the parameters match the preference characteristics in the user profile. In one embodiment, the set of parameters includes a parameter that defines how many matches, or a percentage of matches, are necessary to classify the user as a member of the target group. If the procedure determines a sufficient match, the procedure proceeds along the YES branch to a step 40. If the procedure does not determine a sufficient match, the procedure returns along the NO branch to the step 36.

For example, this parameter may require that at least three other parameters match the preference characteristic in the user profile. In the foregoing example, the user who prefers action movies would only be a member of the target group when his preference characteristics indicate that he watches action movies on a Saturday evening. A minor watching action movies on a Saturday afternoon would not be a member of the target group.

In the step 40, the procedure reports the match of a sufficient number of parameters with the preference characteristics in the user profile to the source 8 of content. As the match indicates only that a sufficient number of parameters matched, the operator of the head end 2 does not know which individual parameters matched. The user's privacy interest is therefore respected. The procedure ends in a step 42.

Figure 3:
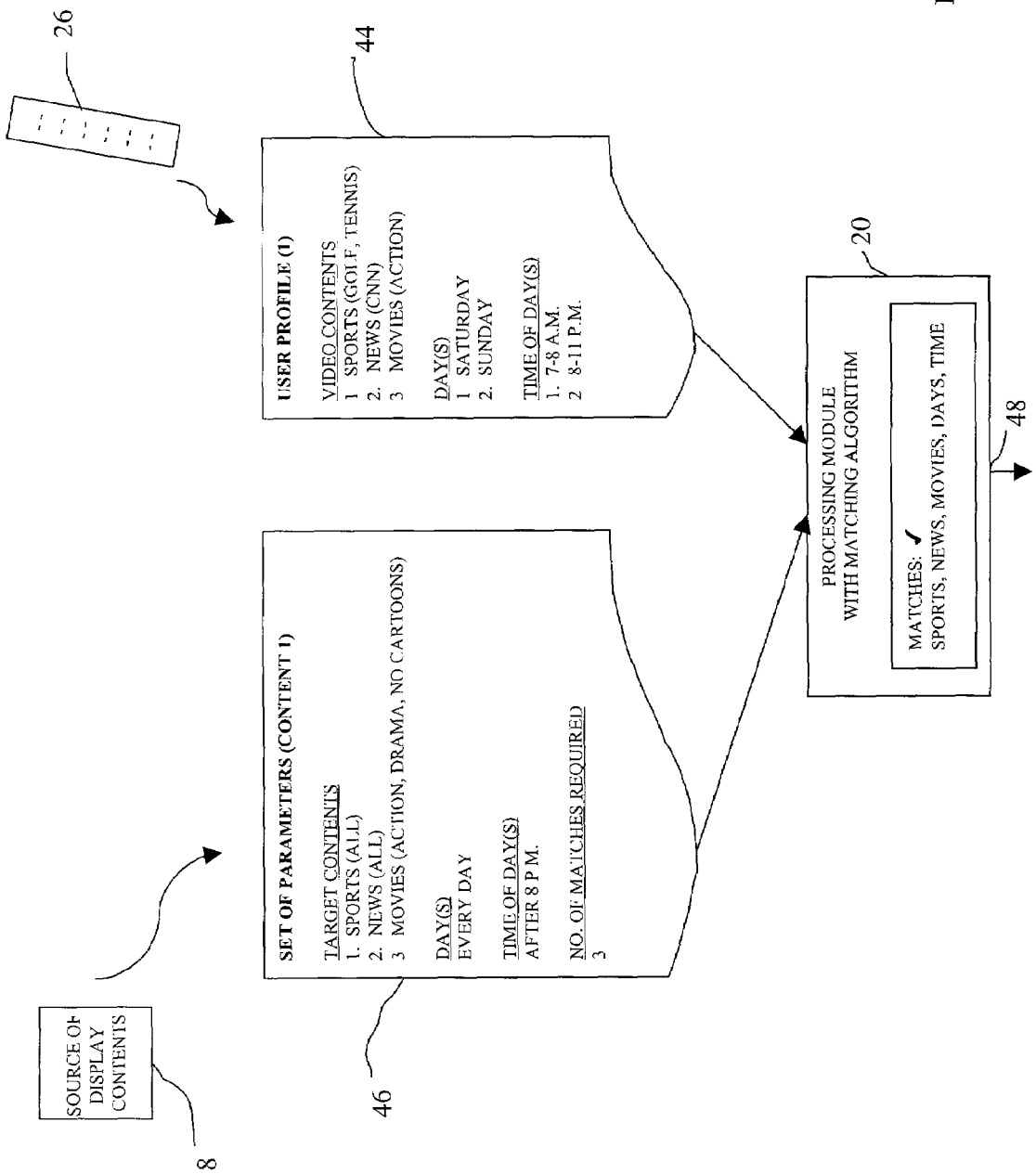
FIG. 3 is an illustration of a list that includes a set of parameters for a predetermined content and of a list that includes a user profile including a user's preference characteristics, wherein a processing module with a matching algorithm correlates the two lists and determines if a sufficient number of the parameters match the preference characteristics.

FIG. 3 is a high-level illustration of one embodiment of the present invention in which the content is a video content for viewing on the display 6. It is contemplated that the high-level illustration is equally applicable to other contents, such as text files or audio files. The high-level illustration shows a list 46 that includes a set of parameters for a predetermined content (CONTENT 1) and a list 44 that includes a user profile including a user's preference characteristics. For illustrative purposes, FIG. 3 shows the source 8 for contents and the remote control 26 to indicate the origins of the lists 44, 46. Further, FIG. 3 shows the processing module 20 that receives the lists 44, 46. It is contemplated that the lists 44, 46 are in electronic form of any appropriate data format and file format readable by the processing module 20.

The list 46 includes a set of parameters that define for which target group this content is likely to be of interest. In the illustrated embodiment, the list 46 includes parameters for the target contents, target days, target time of a day and the number of required matches. The target contents include all sports contents, all news and movies limited to the genre of action and drama, but excluding cartoons. The target days include all days and the target time is after 8 p.m. As an example, the number of required matches is three.

The list 44 includes the preference characteristics of the user. In the illustrated embodiment, the list 44 includes the contents, the days and the time of days. This user prefers golf and tennis and watches mainly on a Saturday and on a Sunday between 7–8 a.m. and between 8–11 p.m. The list 44 is based upon inputs by the user, either by tracking the user's selected channels or by direct input of a preference characteristic into the list 44 by the user.

The content defined by the set of parameters may be a premium content (e.g., conventional TV programs or pay-per-view programs), trailers or video clips for the premium content, or commercials for products or services. For example in the embodiment shown in FIG. 3, an advertiser for a pick-up truck wants to show the commercial for the pick-up truck only to users that prefer action movies and sports and watch after 8 p.m.

In one embodiment, the set of parameters of the list 46 may further include a weighting parameter that indicates that one of the other parameters has more weight than the other parameters. For instance, the advertiser for the pick-up truck may have a strong interest that a user that likes action movies sees this commercial. In this embodiment, the weighting parameter may indicate that the parameter "Action" has more weight than the parameter "Drama."

The processing module 20 includes a matching algorithm and correlates the two lists 44, 46 to determines if a sufficient number of the parameters match the preference characteristics. In the illustrated embodiment, the parameters for content, day and time match the preference characteristics in the user profile. The receive apparatus 4 reports this match to the head end 2 via the transmitter 16.

The head end 2 is coupled to the receive apparatus 4 via the network 13 as shown in FIG. 1. In the illustrated embodiment of the system 1, the network 13 includes a downstream link 12 that the head end 2 uses to send the contents, the corresponding sets of parameters and, for example, an electronic program guide to the receive apparatus 4. The downstream link 12 may be part of an electrical or optical cable network, a satellite network, a wireless network, or a combination of these networks. FIG. 1 shows only one receive apparatus 4, for example, in the home of a user. Those skilled in the art will appreciate that the system 1 may include a plurality of receive apparatuses 4 and that the head end 2 and the network 13 are configured to serve the plurality of receive apparatuses 4.

The network 13 includes further an upstream link 14 that provides for communications from the receive apparatus 4 to the head end 2. The upstream link 14 may be a cable modem transmission link, a V.90 modem transmission link, a digital subscriber line (DSL) transmission link, a "back channel" link within the downstream link 12, or a combination of these links. The head end 2 can receive messages, including the report that a match occurred, from the transmitter 16 of the receive apparatus 4. The head end 2 may process the report in one of several ways depending on how the head end 2 had sent the set of parameters to the receive apparatus.

In one embodiment, the head end 2 sends the set of parameters for a specific content separately before the head end 2 sends the specific content. That is, the receive apparatus 4 receives the set of parameters without the corresponding content. The processing module 20 determines if a sufficient number of parameters match the preference characteristics in the user profile and generates the report as discussed above. The report includes identification data that identifies the receive apparatus 4. The head end 2 processes the report and the identification data and sends the specific content to this receive apparatus 4. Once the user receives the content or any solicitation for the content, the user may accept or reject the content. The head end 2 therefore individually serves the receive apparatus 4.

In an alternative embodiment, the head end 2 may serve several receive apparatuses 4. The head end 2 may be configured to require that a predetermined number of reports must be received before the content is sent to the receive apparatuses 4. In this embodiment, the receive apparatuses 4 receive the same content. It is contemplated that in this embodiment, each user has the option to accept or reject the content.

In a further embodiment, the head end 2 may send the content together with the corresponding set of parameters and "push" this content to the receive apparatus 4. The receive apparatus 4 may store the received content and the set of parameters for deferred processing, or perform the matching as the set of parameters is received. If a sufficient match occurs, the head end 2 receives the report as an acknowledgement that the content is likely to be used by the user.

Upon control by the user, the display 6 displays the content selected by the user for watching. The display 6 may be a TV, a computer monitor or any other display for displaying video data. Further, it is contemplated that the display 6 is configured to display content present in various formats, such as video files, audio files, image files or text files, or a combination of these files. It is further contemplated that content may be received, for example, in the form of a catalogue, a brochure, newsletters or data sheets. This content may be printed on the printer 9 coupled the receive apparatus 4. Further, if the content is represented by audio files, the audio content may be reproduced by the audio system 7.

The profiling agent 24 of the receive apparatus 4 is in one embodiment a software module that executes a matching algorithm. The profiling agent 24 may include software sub-modules, such as a preference engine, that create the user profile and transfer the user profile to the storage device 22. The software sub-modules update the user profile based upon the user's inputs. For example, the software sub-modules create the list 44 that the storage device 22 stores. It is contemplated that the software sub-modules may create individual user profiles for individual users, for example, within a family. The storage device 22 then stores the created user profiles.

The storage device 22 may further store the contents for deferred viewing by the user. The storage device 22 may have a storage capacity of between 10 GB and 30 GB for recording of up to 30 hours of contents. It is contemplated that the system 1 may have video encoders to compress the content prior to transmission or prior to storage and may have video decoders to decompress the content prior to on the display 6. The video encoder and video decoder usually operate in accordance with international standards, e.g., a compression process defined by the Moving Picture Expert Group (MPEG), e.g., MPEG-2, or by the International Telecommunications Union (ITU), e.g., the H.263 standard, that define uniform requirements for video coding and decoding.

Upon receipt of a set of parameter, the profiling agent 24 obtains at least one stored user profile. For example, the profiling agent 24 may obtain the user profile of the user that currently watches TV. The profiling agent 24 performs the matching as described above.

It is contemplated that the receive apparatus 4 may be implemented within a set top box, a digital video recorder or a combination of a set top box and a digital video recorder. For illustrative purposes, however, FIG. 1 shows the receive apparatus 4 coupled between the network 13 and the display 6. Those skilled in the art will appreciate that in an embodiment with a separate set top box the set top box is usually coupled to the network 13.

Figure 4:
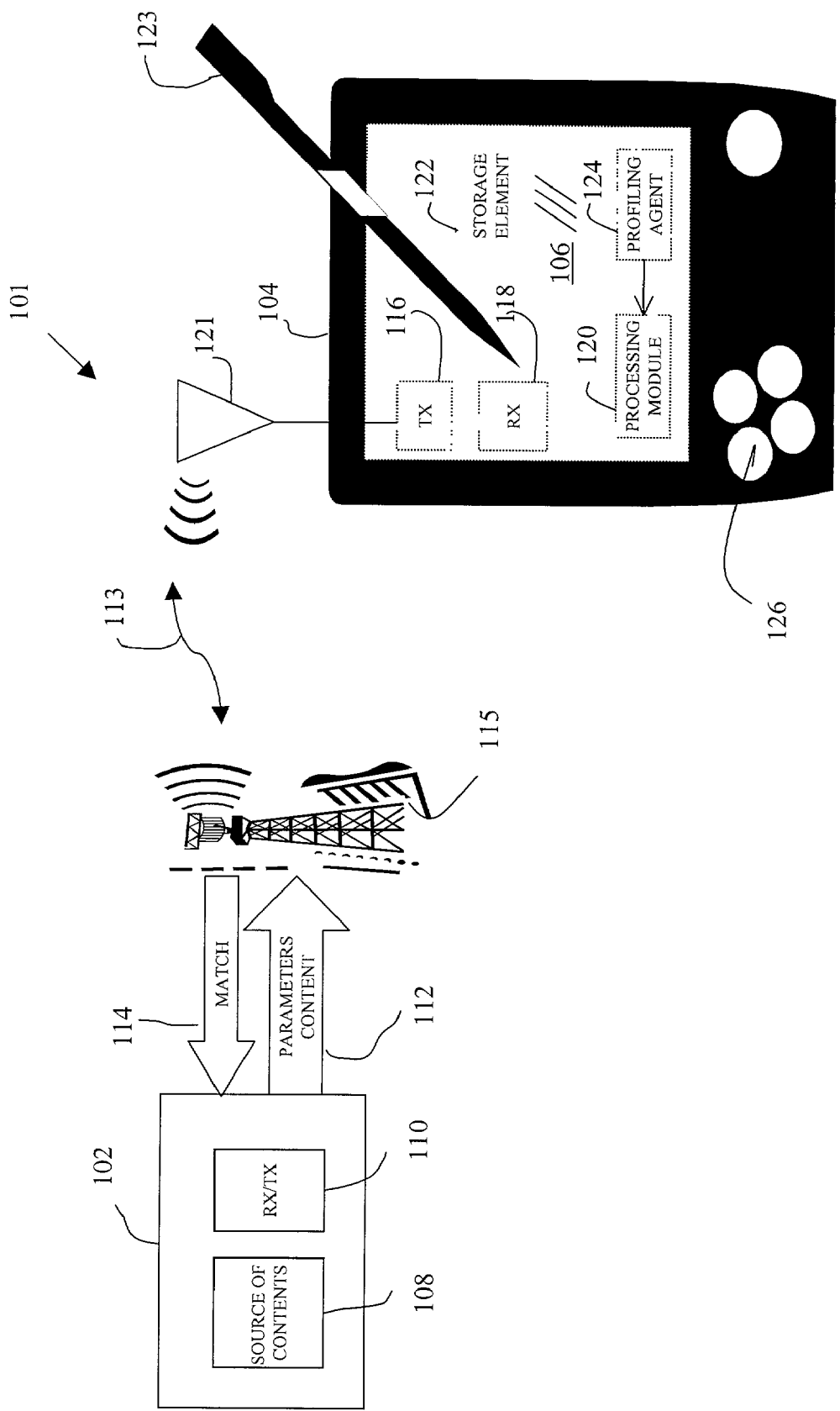
FIG. 4 shows a system for transmitting and receiving a stream of data in accordance with another embodiment of the present invention that includes a head end configured for wireless communications with a wireless user device having a screen for displaying content, wherein the broadcast head end includes a source of contents that provides contents and related parameters, and wherein the wireless user device correlates received parameters with a user profile to determine whether the parameters match preference characteristics in the user profile and reports a match to the head end when a sufficient number of parameters match the preference characteristics.

FIG. 4 shows a system 101 for transmitting and receiving a stream of data in accordance with another embodiment of the present invention. The system 101 includes a head end 102 configured for communications with a wireless user device 104 having a screen 106 for displaying content. The head end 102 and the wireless user device 104 communicate via a network configured for wireless communications. In one embodiment, the network includes at least one transceiver station 115 coupled to the head end 102. The transceiver station 115 may be located at the head end 102. In another embodiment, the transceiver station 115 may be located at a remote location and may be coupled to the head end 102 via a cable network. The transceiver station 115 and the wireless user device 104 communicate via a radio link 113. The transceiver station 115 may be a transmitter station as used in conventional mobile communications systems.

The head end 102 includes a source 108 of contents that provides contents and related parameters to a user as described with reference to FIG. 1. A transceiver 110 is coupled to the transceiver station 115 and provides for the communications between the head end 102 and the wireless user device 104. The transceiver 110 receives a match signal from the wireless user device 104 via an upstream link 114, and transmits the contents and the related parameters to the wireless user device 104 via a downstream link 112. It is contemplated that the upstream link 114 and the downstream link 112 include the radio link 113.

The wireless user device 104 has an antenna 121 to communicate with the head end 102 via the transceiver station 115. The wireless user device 104 includes a receiver 118 (RX), a transmitter 116 (TX), a processing module 120, a profiling agent 124 and a storage element 122. These elements operate generally as the elements included in the receive apparatus 4 shown in FIG. 1 and are described above with reference to FIG. 1. For illustrative purposes, FIG. 4 shows the elements (116, 118, 120, 124, 124) through dotted lines to indicate that these elements are not visible and are hidden by the screen 106.

In the illustrated embodiment, the wireless user device 104 has a shape similar to a handheld personal digital assistant (PDA). It is contemplated that the wireless user device 104 is configured to operate as a conventional PDA and to operate in accordance with the present invention. That is, the user may use an input pen 123 to select a particular operational mode from a menu shown on the screen 106 or to input data. In addition, the user may use buttons 126 to control the wireless user device 104. In one embodiment, the user may define the user profile using the input pen 123, the buttons 126 or the input pen 123 and the buttons 126.

In other embodiments, the wireless user device 104 may have the shape of a laptop computer coupled to a wireless modem, the shape of a cellular phone or the shape of an audio device (e.g., a MP3 player). In addition to operating as a conventional laptop computer, a conventional cellular phone or a MP3 player, the wireless user device 104 operates in accordance with the present invention. Those skilled in the art will appreciate that the elements of the wireless user device 104 are adapted, for example, in size or power consumption for the respective uses. For example, the storage element 122 of the wireless user device 104 configured as a PDA may be a memory chip (e.g., RAM) instead of a hard disc drive (HDD).

Regardless of a particular configuration, the wireless user device 104 receives via the downstream link 112 a set of parameters corresponding to a particular content and correlates these parameter with the user profile maintained within the wireless user device 104. If a match occurs, the wireless user device 104 reports the match to the head end 102 via the upstream link 114 as described above. The content may include text files, audio files, image files or video files. For instance, the user may define the user profile so that the head end 102 presents news and MP3 files. In addition, the user may modify the defined user profile with geographical information, e.g., by inputting the name of a city or a ZIP code to receive mainly information (e.g., maps, tourist information) related to the specified geographical location.

What is claimed is:

1. A method of presenting content to a user at a user location, the content transmitted to the user location from a source of contents, the method comprising:

creating a user profile based upon a plurality of inputs by a user, the user profile representing preference characteristics of the user;

maintaining the user profile at the user location;

receiving at the user location a set of parameters defined for at least one content, the set of parameters defining target groups of users to whom the at least one content is likely to be of interest, the set of parameters originating from the source of contents;

correlating the user profile with the set of parameters at the user location to determine a number of matches between parameters in the set of parameters and preference characteristics in the user profile; and transmitting a match signal from the user location to the source of contents only when the number of matches between the parameters in the set of parameters and the preference characteristics in the user profile is at least a sufficient number to classify the user as a member of a target group of the at least one content, the match signal indicating that at least a sufficient number of matches were determined.

2. The method of claim 1, wherein the sufficient number indicates a minimum number of matches.

3. The method of claim 1, wherein the sufficient number indicates a minimum percentage of matches.

4. The method of claim 1, wherein at least one of the parameters indicates that one or more selected parameters have more weight than other parameters.

5. The method of claim 1, further comprising selectively sending the at least one content represented by the match signal to the user.

6. The method of claim 5, further comprising receiving the at least one content at the user location.

7. The method of claim 6, further comprising storing the at least one content at the user location for deferred presentation to the user.

8. The method of claim 5, wherein the set of parameters represents a solicitation for a predetermined content and wherein the predetermined content is sent when a match signal has been transmitted.

9. The method of claim 1, wherein receiving the set of parameters includes receiving the at least one content defined by the set of parameters.

10. The method of claim 9, wherein the match signal represents an acknowledgement that the user is likely to view the content.

11. The method of claim 1, wherein the at least one content is an advertisement.

12. The method of claim 1, wherein the at least one content has a predetermined format selected from a group consisting of text files, image files, audio files and video files.

13. A method of selecting content for presentation to a user at a user location, the content transmitted to the user location from a source of contents, the method comprising:
    creating a user profile based upon a plurality of inputs by a user, the user profile representing preference characteristics of the user;
    maintaining the user profile at the user location;
    receiving at the user location a set of parameters defined for at least one content, the set of parameters defining target groups of users to whom the at least one content is likely to be of interest, the set of parameters originating from the source of contents;
    correlating the user profile at the user location with the set of parameters to determine a number of matches between parameters in the set of parameters and preference characteristics in the user profile;
    generating a match signal only when the number of matches between the parameters in the set of parameters and the preference characteristics in the user profile is at least a sufficient number to classify the user as a member of a target group of the at least one content, the match signal indicating that at least a sufficient number of matches were determined; and
    sending the match signal from the user location to the source of contents.

14. The method of claim 13, wherein the source of contents stores the at least one content defined by the set of parameters for selectively sending to the user location upon receipt of the match signal.

15. The method of claim 13, further comprising receiving the at least one content at the user location.

16. The method of claim 14, further comprising storing the at least one content at the user location for deferred presentation to the user.

17. The method of claim 13, wherein the sufficient number indicates a minimum number of matches.

18. The method of claim 13, wherein the sufficient number indicates a minimum percentage of matches.

19. The method of claim 13, wherein at least one of the parameters indicates that one or more selected parameters have more weight than other parameters.

20. The method of claim 13, wherein the set of parameters represents a solicitation for a predetermined content and wherein the predetermined content is sent when the source of contents receives a match signal.

21. The method of claim 13, wherein receiving the set of parameters includes receiving the at least one content defined by the set of parameters.

22. The method of claim 21, wherein sending the match signal represents an acknowledgement that the user is likely to view the content.

23. The method of claim 13, wherein the at least one content is an advertisement.

24. The method of claim 13, wherein the at least one content has a predetermined format selected from a group consisting of text files, image files, audio files and video files.

25. A system for receiving and presenting content at a user location, the content transmitted to the user location from a source of contents, the system comprising:
    a profiling agent configured to create a user profile based upon a plurality of inputs by a user, the user profile representing preference characteristics of the user;
    a storage device coupled to the profiling agent and configured to store the user profile;
    a receiver configured to receive a set of parameters defined for at least one content, the set of parameters defining target groups of users to whom the at least one content is likely to be of interest, the set of parameters originating from the source of contents;
    a processing module coupled to the receiver and the storage device, the processing module configured to correlate the user profile with the set of parameters to determine a number of matches between parameters in the set of parameters and preference characteristics in the user profile, and to generate a match signal only when the number of matches between the parameters in the set of parameters and the preference characteristics in the user profile is at least a sufficient number to classify the user as a member of a target group of the at least one content, the match signal indicating that at least a sufficient number of matches were determined; and
    a transmitter coupled to the processing module and configured to send the match signal to the source of contents which stores the at least one content defined by the set of parameters.

26. The system of claim 25, wherein the storage device is configured to further store the set of parameters.

27. The system of claim 25, wherein the receiver is configured to further receive a content sent by the source of contents.

28. The system of claim 25, wherein at least the profiling agent and the storage device are part of a digital video recorder.

29. The system of claim 28, wherein the digital video recorder further includes the receiver and the processing module.

30. The system of claim 25, further comprising an output device to present the at least one content to the user.

31. The method of claim 1, wherein the match signal indicates only that at least a sufficient number of matches were determined.

32. The method of claim 13, wherein the match signal indicates only that at least a sufficient number of matches were determined.

33. The system of claim 25, wherein the match signal indicates only that at least a sufficient number of matches were determined.

* * * * *